United States Patent [19]

Sciortino

[11] 4,161,381
[45] Jul. 17, 1979

[54] ICE CREAM SCOOP

[76] Inventor: August M. Sciortino, 1919A Pickwick La., Glenview, Ill. 60025

[21] Appl. No.: 726,434

[22] Filed: Sep. 27, 1976

[51] Int. Cl.² ............................................. A23P 1/00
[52] U.S. Cl. .................................................. 425/286
[58] Field of Search ........................................ 425/286

[56] References Cited
U.S. PATENT DOCUMENTS

| 1,607,765 | 11/1926 | Levy ................................... 425/286 |
| 2,669,194 | 2/1954 | Brown ................................. 425/286 |
| 2,756,698 | 7/1956 | Eichin et al. ......................... 425/286 |

*Primary Examiner*—William R. Briggs

*Attorney, Agent, or Firm*—Silverman, Cass & Singer, Ltd.

[57] ABSTRACT

An ice cream scoop is made out of sheet metal stamped to shape and comprising a handle, a hemispherical bowl formed integral with the handle and a spring biased ejector pivotally mounted in the handle adjacent the juncture between the bowl and the handle. The ejector includes a tongue which fits into a recess formed on the interior of the bowl and has an oppositely extending integral lever arm which is located at a part of the handle which enables its depression by the user while holding the handle and manipulating the scoop enabling thereby ejection of a ball of ice cream.

3 Claims, 3 Drawing Figures

ICE CREAM SCOOP

REFERENCE TO INCORPORATED PATENT

All of the disclosure of U.S. Pat. No. 2,756,698 including the drawing thereof is incorporated herein by this reference.

BACKGROUND OF THE INVENTION

The field of the invention is ice cream scoops and the invention is directed to a particular modification of a known structure which modification provides unusual advantages.

Ice cream scoops of the construction of the incorporated U.S. Pat. No. 2,756,698 have been made and sold for a substantial period of time with considerable success. The ice cream scoop of such patent is made out of sheet aluminum stamped and formed in the manner described in detail in said patent. The handle 17 of the patented structure has an integral bowl 18 joined thereto at a juncture, the bowl being hemispherical. An arcuate slot 20 is cut in the bowl starting at the juncture and extending about half way through the bowl on the bottom thereof. A rivet 31 is mounted across the handle spaced a short distance from the juncture. A stamped and formed ejector 33 shown in FIGS. 6 and 7 of the patent is mounted by its ears 27 and 28 on the rivet with a stainless steel spring 32 coiled around the rivet and urging the arcuate tongue 24 of the ejector 33 to enter and seat in the slot 20. At this time the integral lever arm 26 of the other end of the ejector 33 is disposed above the remainder of the handle 17 at a point where the user's thumb can engage it. The arcuate tongue 24 closely follows the curvature of the bowl 18 on the interior of the bowl so that a ball of ice cream can be formed therein when the scoop is used. The user presses down on the thumb lever arm 26 to eject the ball. When the ball of ice cream has been ejected, the spring 32 automatically returns the tongue 24 into its slot 20 assuming of course that the user releases the thumb lever arm 26.

The gauge of aluminum used to make the handle and the integral bowl of the scoop of U.S. Pat. No. 2,756,698 was chosen to be 0.063 inch (1.62 mm.) because the presence of the slot 20 weakened the scoop at the juncture between the handle and the bowl, this being the location of greatest stress. It has been found that even with the use of this heavy gauge of aluminum, when the scoop is used to form balls from ice cream which is relatively hard, the pressure required to force the scoop into the bulk of the ice cream may cause the bowl to bend backwards at the juncture thus rendering the scoop useless. Additionally, in order to assure that the tongue 24 does not pivot through the slot 20 but stops at a proper location to give a continuum of the bowl interior for efficiency in scooping and forming the ball of ice cream, the accuracy of dimensions and fit of the tongue 24 and slot 20 must be maintained. This requires frequent dressing and sharpening of the dies. In the commercial version of the scoop of U.S. Pat. No. 2,756,698, the front end 25 of the tongue 24 was formed with a sharp angle to fit into a chamfered front end formed in the slot 20. This provided the stop means for the ejector 33 rather than the back end 20d of the slot.

According to the invention, the slot 20 is eliminated enabling the entire handle and bowl to be stamped from thinner gauge aluminum because the strength of the juncture between the handle and bowl is no longer impaired. The resulting economy is substantial while the strength of the juncture is increased. An added advantage over the scoop of U.S. Pat. No. 2,756,698 is that there are no sharp edges to catch on cloth and paper and no corners or slots which could prevent thorough cleansing and might harbor bacteria.

SUMMARY OF THE INVENTION

Ice cream scoop made out of an integral member of sheet metal stamped and formed to provide a hemispherical bowl connected to a generally rectangular cross section handle, having an ejector comprising an arcuate tongue and a lever arm pivotally mounted on the handle with the tongue entering the bowl. The tongue conforms to the curvature of the bowl and fits into a coined imperforate recess formed in the bowl.

DESCRIPTION OF THE PREFERRED EMBODIMENT

Details which are not set forth here can be ascertained from the description and drawing of patent which is incorporated by reference.

Figure 1:
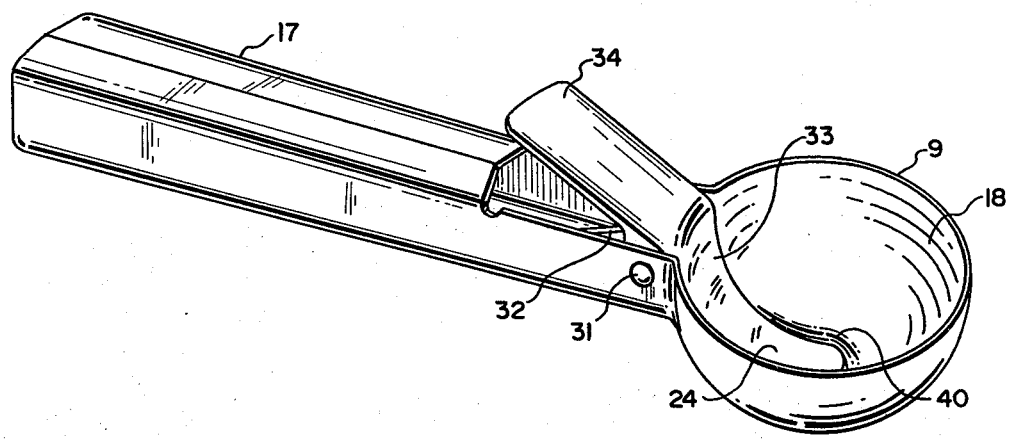
FIG. 1 is a perspective view of the ice cream scoop of the invention.
Figure 2:
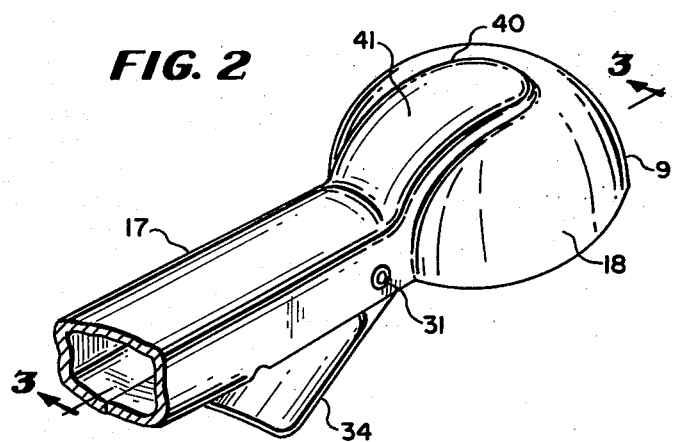
FIG. 2 is a fragmentary bottom perspective view.
Figure 3:
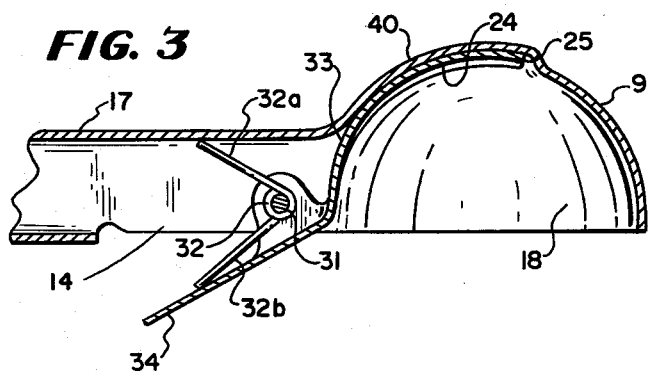
FIG. 3 is a sectional view taken generally along the line 3—3 of FIG. 2 and in the indicated direction.

The ice cream scoop of the invention is shown in FIG. 1 at 9 and this view is substantially the same as FIG. 1 of the reference patent. The handle 17 is generally rectangular in cross section and has the integral hemispherical bowl 18 at its right hand end. The ejector 33 is mounted to the handle by the rivet 31 for rocking movement and has an arcuate tongue 24 that enters and conforms quite closely to the interior of the bowl 18 and a thumb lever arm 34 at the opposite end. A stainless steel coiled spring 32 engages around the rivet 31 and has its ends 32a and 32b arrange to bias the thumb lever arm 34 out of the opening 14 that is provided during the formation of the handle 17 in the vicinity of the rivet 31.

The operation of the scoop 9 is fully described in the incorporated patent. The handle 17, bowl 18 and the ejector 33 are formed in almost the same manner and assembled as explained. The difference between the present invention and the invention of the incorporated patent lies in the construction of the bowl 18.

Instead of a slot in the bowl 18, according to the invention there is an interior imperforate recess 40 coined in the bottom of the bowl by upsetting the metal radially outwardly. This forms a slight smooth exterior protrusion 41 on the bottom of the bowl 18 which does not interfere in any way with the scooping action since the scoop freely slides through the ice cream in use. The tongue 24 as before has its interior surface conforming in configuration to the interior surface of the bowl 18 to form a continuum thereof, but there is no need to taper the front end 25 to provide the stop means for positioning the ejector 33. Instead the tongue 24 can have its edges plain because it is seated in the recess 40 and be juxtaposed relative to the walls of the recess.

Since the protrusion 41 forming the recess 40 is imperforate the bowl has substantial strength compared to such a bowl which would be slotted. Accordingly, the bowl 18 and handle 17 being integrally stamped from the same blank, the gauge of aluminum used can be substantially thinner than previously. Instead of the gauge being 0.063 in. (1.62 mm.) the gauge of aluminum it can be 0.040 inch (1 mm.) which is a substantial saving, especially in view of the increased cost of aluminum occasioned by the shortage of energy in the world at this time. More scoops of greater strength can be made than before from the same quantity of aluminum.

The additional benefits of less die maintenance and ease of cleaning the scoops have been mentioned.

Another advantage which is achieved by the invention and which cannot be achieved by the scoop of U.S. Pat. No. 2,756,698 is that the structure can be varied to increase the size of the tongue 24 of the ejector, if desired. In the patented structure increase of the size of the tongue 24 would result in further weakening of the connection between the bowl and handle. Since the bowl 18 of the invention herein is in no way affected by the size of the tongue 24, being imperforate, the tongue can be made as wide or long as desired. The presence of the protrusion 41 in the bowl of the invention is a form of structural rib means and actually stiffens and strengthens the bowl to an extent greater than the condition of the bowl being imperforate without such structural rib means.

What it is desired to secure by Letters Patent of the United States is:

1. In an ice cream scoop which comprises a generally hemispherical bowl and a hollow handle formed and stamped from an integral blank of sheet metal of uniform thickness, the handle being generally polygonal in cross section and connected to the bowl at a juncture but having a relatively short opening adjacent said juncture, an ejector pivotally mounted on the handle adjacent to the juncture and comprising an arcuate tongue projecting into the bowl past the juncture and having its outwardly facing surface generally conforming to the interior surface of the bowl and a short thumb lever arm formed on the ejector at the end opposite the tongue, the thumb lever arm, being disposed on the handle side of the juncture extending above the handle and available to be depressed by the thumb of the user into said short opening to rock the ejector and raise the tongue out of the bowl in a movement adapted to eject a ball of ice cream which may have been formed in the bowl by scooping, the ejector being spring biased to move the tongue into the bowl to bottom on the interior of the bowl, and the majority of the handle being available for gripping by the user's fist during scooping without using said ejector, the invention herein which comprises:

the bowl having an exterior imperforate arcuate protrusion formed therein giving rise to a shallow interior arcuate recess, the recess and protrusion being located in the bottom of the bowl and in alignment with the ejector and arranged to receive the back surface of the tongue when the tongue is bottomed in the bowl, the recess being configured to mate with the tongue, the depth of the recess being such that the outwardly facing surface of the tongue forms a substantially hemispherical continuum of the interior surface of the bowl when the tongue is bottomed in the bowl within said recess and the recess extending along the bowl at least to the juncture of bowl and handle whereby to provide stepped ribs adjacent the recess and connected to said handle.

2. In a scoop as claimed in claim 1 the metal junction between the protrusion and the bowl on the exterior thereof having a step with a gradual rise so as not to obstruct movement of the scoop through ice cream.

3. An ice cream scoop which comprises a generally hemispherical bowl and a hollow handle formed and stamped from an integral blank of sheet metal of uniform thickness, the handle being generally polygonal in cross section and connected to the bowl at a juncture but having a relatively short opening adjacent said juncture, an ejector pivotally mounted on the handle adjacent to the juncture and comprising an arcuate tongue projecting into the bowl past the juncture and having its outwardly facing surface generally conforming to the interior surface of the bowl and a short thumb lever arm formed on the ejector at the end opposite the tongue, the thumb lever arm, being disposed on the handle side of the juncture extending above the handle and available to be depressed by the thumb of the user into said short opening to rock the ejector and raise the tongue out of the bowl in a movement adapted to eject a ball of ice cream which may have been formed in the bowl by scooping, the ejector being spring biased to move the tongue into the bowl to bottom on the interior of the bowl, and the majority of the handle being available for gripping by the user's fist during scooping without using said ejector, the bowl having an exterior imperforate arcuate protrusion formed therein giving rise to a shallow interior arcuate recess, the recess and protrusion being located in the bottom of the bowl and in alignment with the ejector and arranged to receive the back surface of the tongue when the tongue is bottomed in the bowl, the recess being configured to mate with the tongue, the depth of the recess being such that the outwardly facing surface of the tongue forms a substantially hemispherical continuum of the interior surface of the bowl when the tongue is bottomed in the bowl within said recess, said recess extending along the bowl at least to the juncture of bowl and handle whereby to provide stepped ribs adjacent the recess and connected to said handle.

* * * * *